US009825692B1

(12) United States Patent
Murphy

(10) Patent No.: US 9,825,692 B1
(45) Date of Patent: Nov. 21, 2017

(54) UAV CELLULAR COMMUNICATION SERVICE DELIVERY

(71) Applicant: T-Mobile USA, Inc., Bellevue, WA (US)

(72) Inventor: Sean Patrick Murphy, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/378,045

(22) Filed: Dec. 14, 2016

(51) Int. Cl.
H04B 7/15 (2006.01)
H04B 7/185 (2006.01)
H04W 64/00 (2009.01)
H04W 16/26 (2009.01)
B64C 39/02 (2006.01)
G08G 5/00 (2006.01)
H04W 84/04 (2009.01)

(52) U.S. Cl.
CPC ....... *H04B 7/18506* (2013.01); *B64C 39/024* (2013.01); *G08G 5/003* (2013.01); *H04W 16/26* (2013.01); *H04W 64/003* (2013.01); *H04W 64/006* (2013.01); *B64C 2201/122* (2013.01); *H04W 84/042* (2013.01)

(58) Field of Classification Search
CPC .......... G06Q 30/0201; H04B 7/18504; H04M 15/68; H04M 15/8038; H04W 16/00; H04W 16/18; H04W 16/26; H04W 24/02; H04W 24/08; H04W 28/0289; H04W 64/006; H04W 84/005; H04W 84/06

USPC ...... 455/406, 404.2, 431, 456.5, 450, 452.1, 455/453, 456.1, 41.2, 13.1, 512, 524, 455/552.1, 442, 436, 11.1, 297; 701/2, 701/302, 96, 486; 244/135 R, 10; 370/316, 315; 340/870.02
See application file for complete search history.

(56) References Cited

U.S. PATENT DOCUMENTS

| 6,246,883 | B1 * | 6/2001 | Lee | H04H 20/04 340/870.02 |
| 9,456,361 | B1 * | 9/2016 | Levy | H04W 24/02 |
| 2007/0284474 | A1 * | 12/2007 | Olson | G05D 1/0022 244/10 |
| 2010/0198514 | A1 * | 8/2010 | Miralles | F41G 7/008 701/302 |
| 2011/0068224 | A1 * | 3/2011 | Kang | B64C 39/024 244/116 |

(Continued)

*Primary Examiner* — Tan H Trinh
(74) *Attorney, Agent, or Firm* — Han Santos, PLLC; Elliott Y. Chen

(57) ABSTRACT

The use of UAV network cells may enable a wireless communication carrier to provide supplemental cellular network communication coverage to geographical areas. Geolocations of multiple user devices in a geographical area that is serviced by an unmanned aerial vehicle (UAV) network cell may be determined. Subsequently, operation condition data for the geographical area that affect at least one of UAV flight or UAV communication signal transmission or reception for the UAV network cell may be received. Accordingly, a flight trajectory that provides network coverage to one or more specific user devices in the geographical area may be generated based on the geolocations of the multiple user devices and the operation condition data. A control command is then sent to the UAV network cell to direct the UAV network cell to travel according to the flight trajectory.

20 Claims, 7 Drawing Sheets

(56) References Cited

U.S. PATENT DOCUMENTS

| | | | |
|---|---|---|---|
| 2011/0180667 A1* | 7/2011 | O'Brien | B64C 39/022 244/135 R |
| 2012/0243775 A1* | 9/2012 | Ma | G06T 7/593 382/154 |
| 2013/0116908 A1* | 5/2013 | Oh | G01S 19/07 701/96 |
| 2014/0249692 A1* | 9/2014 | Levien | B64C 39/024 701/2 |
| 2015/0063202 A1* | 3/2015 | Mazzarella | H04B 7/18504 370/316 |
| 2015/0203213 A1* | 7/2015 | Levien | G01C 21/00 701/486 |
| 2015/0236778 A1* | 8/2015 | Jalali | H04W 84/06 370/316 |
| 2015/0316927 A1* | 11/2015 | Kim | G03B 15/006 701/2 |
| 2015/0334545 A1* | 11/2015 | Maier | H04W 4/005 455/404.2 |
| 2015/0336667 A1* | 11/2015 | Srivastava | B64C 39/024 701/2 |
| 2016/0028471 A1* | 1/2016 | Boss | H04W 84/06 455/406 |
| 2016/0050012 A1* | 2/2016 | Frolov | H04B 7/18506 455/431 |
| 2016/0088585 A1* | 3/2016 | Garg | H04W 64/006 455/456.5 |
| 2016/0101856 A1* | 4/2016 | Kohstall | G05D 1/101 244/17.13 |
| 2016/0156406 A1* | 6/2016 | Frolov | H04W 16/28 455/431 |
| 2016/0266579 A1* | 9/2016 | Chen | G05D 1/0038 |
| 2016/0300493 A1* | 10/2016 | Ubhi | H04B 7/18504 |
| 2016/0330771 A1* | 11/2016 | Tan | H04W 16/14 |
| 2016/0371987 A1* | 12/2016 | Kotecha | G08G 5/0013 |
| 2016/0373963 A1* | 12/2016 | Chechani | H04W 28/08 |
| 2017/0012697 A1* | 1/2017 | Gong | H04W 40/02 |
| 2017/0017240 A1* | 1/2017 | Sharma | B64C 39/024 |
| 2017/0094530 A1* | 3/2017 | Ross | B64C 39/024 |
| 2017/0101179 A1* | 4/2017 | Michael | B64C 39/024 |
| 2017/0115667 A1* | 4/2017 | Marr | G05D 1/101 |
| 2017/0124884 A1* | 5/2017 | Shaw | H04W 28/0247 |
| 2017/0150373 A1* | 5/2017 | Brennan | H04W 16/28 |
| 2017/0162064 A1* | 6/2017 | Ubhi | G08G 5/0069 |
| 2017/0169713 A1* | 6/2017 | Gong | G08G 5/006 |
| 2017/0171761 A1* | 6/2017 | Guvenc | H04W 16/22 |
| 2017/0181117 A1* | 6/2017 | Dowlatkhah | H04W 64/003 |
| 2017/0181158 A1* | 6/2017 | Gong | H04W 72/0433 |
| 2017/0193820 A1* | 7/2017 | Sham | G08G 1/0175 |
| 2017/0195038 A1* | 7/2017 | Sham | H04B 7/18504 |
| 2017/0195048 A1* | 7/2017 | Sham | H04B 10/1129 |
| 2017/0195694 A1* | 7/2017 | Sham | H04N 21/214 |
| 2017/0201313 A1* | 7/2017 | Chang | H04B 7/18502 |
| 2017/0208512 A1* | 7/2017 | Aydin | H04W 36/0055 |
| 2017/0235316 A1* | 8/2017 | Shattil | G05D 1/104 701/3 |
| 2017/0238229 A1* | 8/2017 | Schemagin | H04W 36/32 455/440 |
| 2017/0257779 A1* | 9/2017 | Zerick | H04W 16/26 |

* cited by examiner

UAV CELLULAR COMMUNICATION SERVICE DELIVERY

BACKGROUND

Wireless communication devices are integral to the daily lives of most users. Wireless communication devices are used to make voice calls, check email and text messages, update social media pages, stream media, browse websites, and so forth. As a result, users of wireless communication devices expect telecommunication carriers to provide constant and reliable wireless communication service at all times.

In some instances, wireless communication services may become disrupted due to natural or human-originated events. For example, a natural disaster may knock out power or communication cables to network cells in a geographical area. In another example, a celebratory event or sporting event may result in an exceptionally large number of users that overwhelm network cells and prevent the network cells from providing adequate wireless communication services. In such instances, a wireless communication carrier may deploy a ground wireless communication support vehicle to the affected geographical area to provide network coverage.

However, in some scenarios, the deployment of a ground wireless communication support vehicle may be hampered by natural terrain features and/or artificial obstacles. For example, steep hills or the lack of passable roadways may prevent a ground wireless communication support vehicle from reaching an affected geographical area to provide supplemental wireless communication services. The lack of the supplemental wireless communication services may disrupt the ability of first responders to respond to emergency events and coordinate emergency service efforts, as well as prevent the general public from carrying out normal wireless communication during events.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
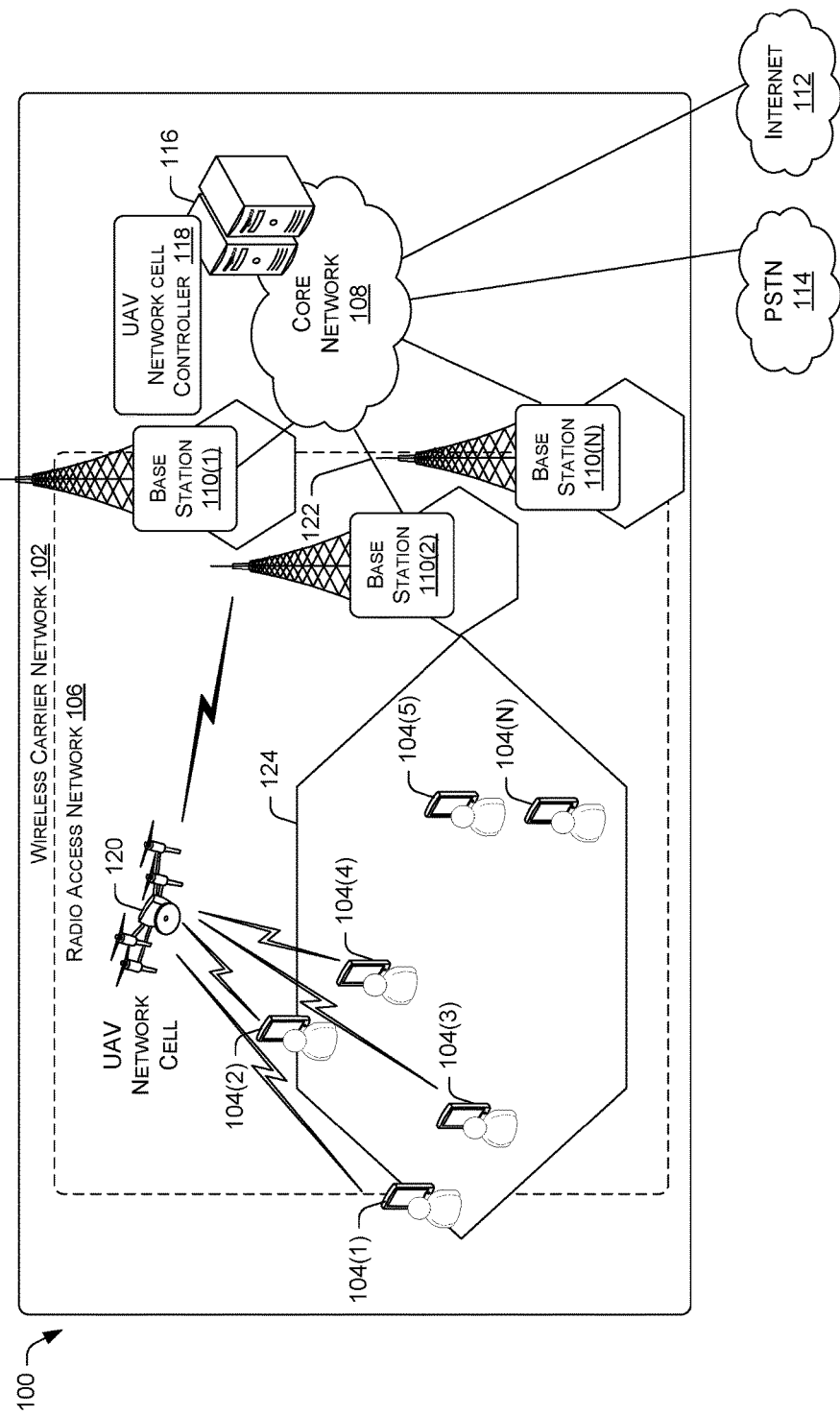
FIG. 1 illustrates an example environment for implementing unmanned aerial vehicle (UAV)-based cellular communication service delivery.

This disclosure is directed to techniques for using unmanned aerial vehicles (UAVs) to provide cellular network communication coverage. The cellular network communication coverage may be delivered by the UAVs to a geographical area that otherwise does not have network coverage from ground network cells. In some instances, the geographical area may be a region that is experiencing a natural disaster or a manmade event that has disrupted the functionalities of existing ground network cells. In other instances, the geographical area may be a remote region that is not normally provided with cellular network communication coverage. However, due to the occurrence of certain events, it may become desirable for a wireless communication carrier to provide network communication coverage on a temporary basis for the remote region. For example, emergency responders may have been dispatched to the remote region to fight a forest fire or conduct a rescue operation that is to be coordinated via cellular network communication. In some scenarios, UAVs carrying communication equipment that provides network cells, referred to as UAV network cells, may be dispatched to a geographical region.

The UAV network cells may be dispatched in the event that a ground vehicle unit that is capable of providing the cellular network communication coverage is unable to travel to the geographical area, or reach the geographical area in a designated amount of time. For example, the roads to an affected geographical area may be rendered impassible or barely passable by a natural disaster or a manmade event. In another example, terrain features and the lack of existing roadways may prevent the ground vehicle unit from reaching the geographical area. A UAV network cell that is dispatched to a particular geographical area by a wireless communication carrier may enable user devices of service subscribers to use the wireless communication services provided by the carrier network of the carrier.

In various embodiments, UAV network cells may be dispatched by an UAV network cell controller of a wireless communication carrier. In determining whether to dispatch an UAV network cell, the UAV network cell controller may take into consideration not only whether a ground vehicle unit is capable of being dispatched to provide the same service, but also a multitude of other factors. These multitude of other factors may include weather conditions, geographical features, network service capacity, government flight regulations and restrictions, and/or so forth. In some embodiments, an UAV network cell that is dispatched to a geographical area may be configured to prioritize the handling of communication for specific high priority user devices. In such embodiments, the high priority user devices may be user devices that are used by emergency responders, law enforcement officers, and/or other critical personnel (e.g., wireless carrier technicians) sent to the geographical area.

The use of UAV network cells may enable a wireless communication carrier to provide supplemental cellular communication coverage, also referred to herein as network coverage, to geographical areas that are otherwise inaccessible or difficult to access in a reasonable amount of time using ground-vehicle based network cells. In this way, UAV network cells of a wireless communication carrier may provide supplemental wireless communication services to subscriber user devices when a natural disaster or a manmade event disrupts normal wireless communication services. Alternatively, the UAV network cells of a wireless communication carrier may provide temporary but essential wireless communication services to remote regions to support emergency responses or law enforcement activities. The techniques described herein may be implemented in a number of ways. Example implementations are provided below with reference to the following FIGS. 1-7.

Example Environment Architecture

FIG. 1 illustrates an example environment 100 for implementing unmanned aerial vehicle (UAV)-based cellular communication service delivery. The environment 100 may include a wireless carrier network 102 that services multiple user devices, such as the user devices 104(1)-104(N) of multiple subscribers. The wireless carrier network 102, as operated by a telecommunication carrier, may include a radio access network 106 and a core network 108. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The radio access network 106 may include multiple base stations, such as the ground base stations 110(1)-110(N). The ground base stations 110(1)-110(N) are responsible for handling voice and data traffic between user devices 104(1)-104(N) and the core network 108. Accordingly, each of the base stations 110(1)-110(N) may provide a corresponding ground network cell that delivers telecommunication and data communication coverage. The core network 108 may use the network cells to provide communication services to the multiple user devices 104(1)-104(N). For example, the core network 108 may connect the user devices 104(1)-104(N) to other telecommunication and data communication networks, such as the Internet 112 and the public switched telephone network (PSTN) 114. In various embodiments, the core network 108 may include one or more computing devices 116 that implement network components. The network components may include a serving GPRS support node (SGSN) that routes voice calls to and from the PSTN 114, a Gateway GPRS Support Node (GGSN) that handles the routing of data communication between external packet switched networks and the core network 108. The network components may further include a Packet Data Network (PDN) gateway (PGW) that routes data traffic between the GGSN and the Internet 112. Additionally, an UAV network cell controller 118 may be implemented by the computing devices 116 of the core network 108.

Each of the user device 104(1)-104(N) may be a smartphone, a tablet computer, an embedded computer system, or any other device that is capable of using the wireless communication services that are provided by the wireless carrier network 102. In various embodiments, a user may use a user device to make voice calls, send and receive text messages, and download content from the Internet 112.

The UAV network cell controller 118 may dispatch UAV network cells to provide supplemental network communication coverage to geographical areas. For example, an UAV network cell 120 may be dispatched to provide a network cell 124 that covers a geographical area. The geographical area may include a region in which normal ground cellular communication coverage has been disrupted or remote regions that are otherwise unequipped with ground cellular communication coverage. The normal ground cellular communication coverage may be disrupted due to natural disasters or manmade events.

Each of the UAV network cells may be a drone flight vehicle in the form of a fixed wing aircraft, a rotary wing aircraft, a rigid buoyant gas airship, a non-rigid buoyant gas airship, and/or so forth. The drone flight vehicle may be equipped with a micro eNodeB for providing cellular communication uplink and downlink to user devices. The drone flight vehicle may be further equipped with a communication relay component that relays communication traffic of the user devices to a nearby ground base station. For example, the UAV network cell 120 may provide cellular communication uplink and downlink to the user devices 104(1)-104(N), while relaying any communication traffic from the user devices 104(1)-104(N) to the base station 110(2). In this way, the UAV network cell 120 may ultimately use the backhaul 122 of the base station 110(2) to route communication traffic of the user devices 104(1)-104(N) between itself and the core network 108. In other words, the base station 110(2) may act as a donor site with respect to the UAV network cell 120 for routing communication traffic to the core network 108.

A UAV network cell, such as the UAV network cell 120, may use a wireless in-band relay backhaul to relay communication traffic of the user devices to a base station. In such instances, wireless in-band relay backhaul means the UAV network cell may use the same communication band for both providing communication links to the user devices and relaying communication traffic of the user devices to the base station. The UAV network cell may implement the wireless in-band relay backhaul by using some physical resource blocks of a communication band for uplink/downlink with the user devices, while using other physical resource blocks of the communication band for relaying communication traffic of the user devices to the base station.

In other instances, the UAV network cell may use multiple communication bands in a multiple input, multiple output (MIMO) fashion, in which a set of communication bands is reserved for uplink/downlink communication with the user devices, while another set of communication bands is reserved for relaying communication traffic of the user devices to the base station. In still other instances, the UAV-band network cell may use multiple communication techniques to implement the uplink/downlink communication with the user devices and the relay communication with the base station. For example, the UAV network cell may use a LTE communication band for the uplink/downlink with the user devices, while using a microwave band or an optical signal to relay communication traffic of the user devices to the base station.

The UAV network cell controller 118 may control the flight of the UAV network cell via control commands. The control commands may be sent to the UAV network cell via base stations and/or a satellite. In some embodiments, the base stations may send the control commands to the UAV network cell via a dedicated flight control communication band. The dedicated flight control communication may be further used to receive operational information from the UAV network cell. In other embodiments, the base stations may send the control commands to the UAV network cell via in-band control communication. In such embodiments, some of the physical resources blocks of the communication band that is used for relaying user device communication traffic to and from the UAV network cell may be appropriated for control command use. In particular, the physical resource blocks may be used to send control commands to the UAV network cell and receive operational information from the UAV network cell.

The use of a satellite for sending the control commands to the UAV network cell may involve the UAV network cell controller 118 transmitting the control commands to the satellite via a satellite communication channel. In turn, the satellite may transmit the control commands to the UAV network cell via a satellite downlink channel. Conversely, the UAV network cell may use a satellite uplink channel to transmit the operational information to the satellite, such that the satellite may use the satellite communication channel to relay the operational information of the UAV network cell to the UAV network cell controller 118. Generally speaking, communication between an UAV network cell and base stations may be limited in range, and communication between the UAV network cell and a satellite may be far reaching and less affected by terrain obstacles. Accordingly, in some circumstances, the UAV network cell controller 118 may default to using base stations to communicate control commands and operational information with an UAV network cell whenever possible. However, when base station communication with the UAV network cell is lost, the UAV network cell controller 118 may switch to using satellite communication to send the control commands the UAV network cell and receive operational information from the UAV network cell.

The control commands sent by the UAV network cell controller 118 to the UAV network cell may direct the flight path of the UAV network cell. The control commands may also command the UAV network cell to perform automated operations, such as automatically takeoff from a departure point, fly to a particular geographical location, hover at the particular geographical location at a preset altitude, fly in a holding pattern with respect to the particular geographical location, return to and land at a predetermined destination point, and/or so forth. The operational information that is provided by the UAV network cell may include fight telemetry information, geolocation information, UAV health information (e.g., engine status, fuel/power status, flight control surface status, communication equipment status, warning information, self-diagnostic information, etc.), and/or so forth.

In various embodiments, the UAV network cell controller 118 may dispatch an UAV network cell to provide network coverage at a geographical area using control commands. In determining whether to dispatch an UAV network cell, the UAV network cell controller 118 may take into consideration not only whether a ground vehicle unit may be dispatched to provide the same service, but also a multitude of other factors. These factors may include weather conditions, geographical features, network service capacity, governmental flight regulations and restrictions, and/or so forth. In some instances, the UAV network cell may be tasked to provide a network cell that covers a largest portion of the geographical area.

In other instances, the UAV network cell may be tasked with delivering cellular communication coverage to a highest number of users in the geographical area. For example, the UAV network cell 120 may be positioned to provide cellular communication service to the cluster of user devices 104(1)-104(4), while user devices 104(4)-104(N) may be left without cellular communication coverage. In additional instances, an UAV network cell that is dispatched to the geographical area may be configured to prioritize the handling of communication for specific high priority user devices. In such embodiments, the high priority user devices may be user devices that are used by emergency responders and/or other critical personnel sent to the geographical area.

Example UAV Network Cell Components

Figure 2:
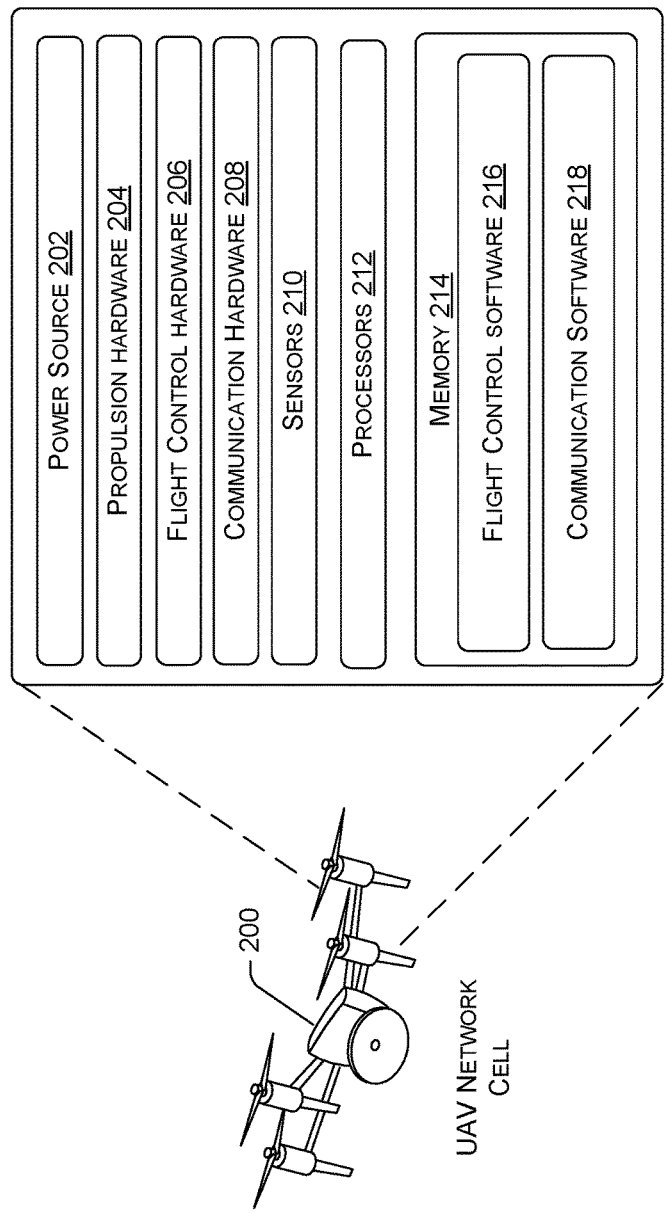
FIG. 2 is a block diagram showing various components of an UAV network cell that provides network coverage.

FIG. 2 is a block diagram showing various components of an UAV network cell 200 that provides network coverage. The UAV network cell 200 may include a power source 202, propulsion hardware 204, flight control hardware 206, communication hardware 208, sensors 210, one or more processors 212, and memory 214. The power source 202 may include electrical cells, combustible liquid fuel, combustible gas fuel, solid propellant fuel, solar panels, compressed gas, and/or other energy sources. The propulsion hardware 204 may include mechanical devices that are capable of converting the energy provided by the power source 202 into movement of the UAV network cell 200. For example, the propulsion hardware may include an internal combustion engine, an electrical motor, a jet engine, a turboprop engine, a rocket engine, propellers, rotors, and/or so forth that are mounted on the wings and/or the body of the UAV network cell 200.

The flight control hardware 206 may include actuators and control surfaces that are capable of steering the UAV network cell 200. For example, the actuators may include hydraulic actuators, gas powered actuators, electrical actuators, and/or so forth. The actuators may move or deflect control surfaces to control the movement of the UAV network cell 200. The control surfaces may include tilt wings, rudders, slats, ailerons, elevators, trim tabs, fins, canards, and/or so forth. In some embodiments, the flight control hardware 206 may be integrated with the propulsion hardware 204. For example, such integrated hardware may include tilt rotors, variable pitch rotors, jet engines with movable thrust nozzles, and/or so forth.

The communication hardware 208 may include hardware components that enable the UAV network cell 200 to provide supplemental cellular communication coverage to the user devices 104(1)-104(N), as well as communicate with the UAV network cell controller 118. In various embodiments, the communication hardware 208 may include digital signal processors (DSPs), which includes single-core or multiple-core processors. The processors may perform operation in parallel to process a continuous stream of data. The communication hardware 208 may also include network processors that manage high speed communication interfaces, including communication interfaces that interact with peripheral components. The network processors and the peripheral components may be linked by switching fabric. The communication hardware 208 may further include hardware decoders and encoders, an antenna controller, a memory buffer, a network interface controller, signal transceivers, a subscriber identity module (SIM) card slot, a universal serial bus (USB) controller, and/or other signal processing and communication components. A SIM card may be inserted into the SIM card slot to enable the UAV network cell 200 to communicate with a ground base station. Alternatively, the SIM card may be an embedded SIM card that is hardwired to the other components. Accordingly, the communication hardware 208 may support the transmission and reception data for cellular communication, microwave communication, and/or other forms of electromagnetic energy-based communication.

The communication hardware 208 may further include one or more antennae that support the transmission and reception of data signals. The antennae may include a Yagi antenna, a horn antenna, a dish reflector antenna, a slot antenna, a waveguide antenna, a Vivaldi antenna, a helix antenna, a planar antenna, a dipole array antenna, an origami antenna, and/or other types of antenna. In some instances, an antenna may be oriented to point to a particular direction via electrical beam forming and/or via mechanical movement of one or more elements of the antenna by the antenna controller. For example, an antenna that is configured to provide cellular uplink/downlink to the user devices 104(1)-104(N) may be oriented to broadcast and receive radio signals below the body of the UAV network cell 200 in a downward facing hemispherical pattern, as the UAV network cell 200 is generally flying above the user devices 104(1)-104(N). In another example, an antenna that is configured to communicate with a base station or a satellite may be continuously reoriented in the direction of the base station or the satellite as the UAV network cell 200 travels along a flight path.

The sensors 210 may include a camera, a radar, a compass, an air speed sensor, an altitude sensor, a global positioning system (GPS) sensor, control setting sensors, propulsion setting sensors, vehicle system health sensors, a transponder interrogator, and/or other sensors. The various sensors may provide operational information regarding the UAV network cell 200 that is transmitted by the communication hardware 208 to the UAV network cell controller 118. In some instances, the UAV network cell 200 may be further equipped with a transponder that provides vehicle identification and flight status information in response to a radio frequency interrogation.

Each of the processors 212 may be a single-core processor, a multi-core processor, a complex instruction set computing (CISC) processor, or another type of processor. The memory 214 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 212 and the memory 214 may implement flight control software 216 and communication software 218. The flight control software 216 may receive control commands from the UAV network cell controller 118. In turn, the flight control software 216 may manipulate the propulsion hardware 204 and the flight control hardware 206 according to the control commands. Further, the flight control software 216 may aggregate the operational information collected by the sensors 210 for transmission to the UAV network cell controller 118. In some embodiments, the flight control software 216 may include algorithms that perform automatic flight operations, such as flying to a particular location from a departure point or landing at a specific location.

In other instances, the flight control software 216 may include an airborne collision avoidance system (ACAS) that automatically diverts the UAV network cell 200 from a flight path in response to proximity of another airborne vehicle that is sensed via radar information, image information, and/or transponder information that is obtained by the sensors 210, or in response to proximity of a terrain obstacle that is stored in an internal map database of the UAV network cell 200.

The communication software 218 may work in conjunction with the communication hardware 208 to provide cellular communication coverage for user devices, as well as maintain communicate with the UAV network cell controller 118. In various embodiments, the communication software 218 may include software components that are associated with the layers in an Open Systems Interconnection model (OSI) model. Such layers may include a physical layer, a data link layer, a network layer, a transport layer, a session layer, a presentation layer, and an application layer. For example, the software components may include radio drivers, data packet schedulers, data encoders, data decoders, antenna control software that control in-band data aggregation, data routing, data transmission, and data reception functions.

Example UAV Network Cell Controller Components

Figure 3:
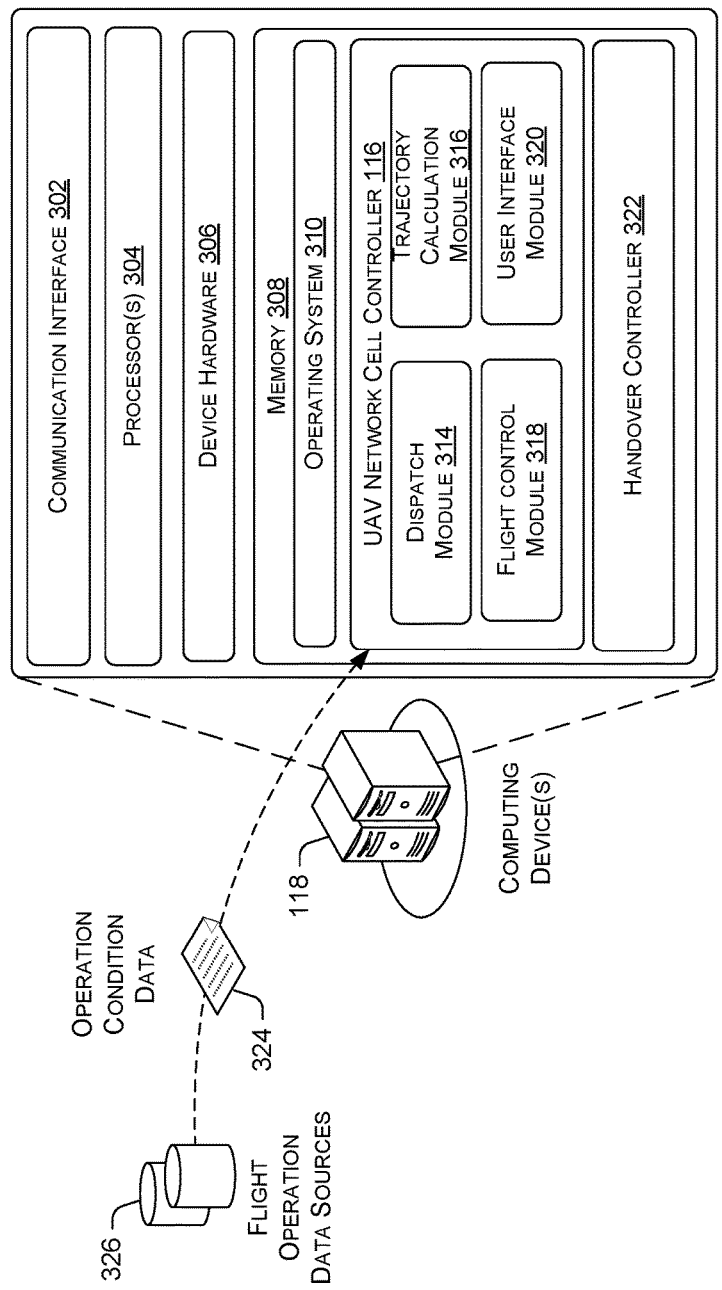
FIG. 3 is a block diagram showing various components of an UAV network cell controller of a carrier network that manages UAV-based network cells.

FIG. 3 is a block diagram showing various components of an UAV network cell controller 118 that manages UAV-based network cells. The UAV network cell controller 118 may be implemented on one or more computing devices 116. The computing devices 116 may be a part of the radio access network 106 or the core network 108. The computing devices 116 may include a communication interface 302, one or more processors 304, memory 306, and device hardware 308. The communication interface 302 may include wireless and/or wired communication components that enable the computing devices to transmit data to and receive data from other networked devices via the wireless carrier network 102. The device hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the computing devices 116 may implement an operating system 310, the UAV network cell controller 118, and a handover controller 312. The operating system 310 may include components that enable the computing devices 116 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The UAV network cell controller 118 may include a dispatch module 314, a trajectory calculation module 316, a flight control module 318, and a user interface module 320. These modules may include routines, program instructions, objects, and/or data structures that perform particular tasks or implement particular abstract data types.

The dispatch module 314 may determine whether to dispatch an UAV network cell based on multiple factors. These factors may include whether it is feasible to dispatch a ground vehicle ground vehicle unit to provide supplement cellular network communication coverage in a desired amount of time. For example, lack of roadways, impassible terrain, or difficult road conditions may make it impractical or impossible to deploy the ground vehicle unit. Weather conditions may also be a factor that affects the decision to dispatch an UAV network cell. For example, high wind conditions or rain storms may ground UAV network cells until wind speed or precipitation level falls below a maximum threshold.

The factors may also include the suitable of an available UAV network cell to the parameters of deployment. The parameters of the deployment may include a size of the geographical area, a number of user devices that are expected to be in the geographical area, the expected ground movement speed of the user devices to be served, the elevations of geographical features in the geographical area, the proximity of the nearest ground base station to the geographical area, and/or other factors.

The suitability of an available UAV network cell may dependent on the specifications of the UAV network cell. The specifications of the UAV network cell may include the transmission power of the eNodeB in the UAV network cell, the transmission power of the relay transceiver of the UAV network cell for communicating with the base station, the maximum flight ceiling of the UAV network cell, the maximum aloft endurance time of the UAV network cell, the cruising speed of the UAV network cell, the stationary hovering capability of the UAV network cell, and/or other flight or communication characteristics of the UAV network cell. For example, an UAV network cell in the form of a non-rigid buoyant gas airship may have a high aloft endurance time but a low airspeed. Accordingly, such an UAV network cell may be ideal for servicing a small remote geographical area for a long duration. On other hand, a rotary wing UAV network cell may have the ability to hover at a fixed position but may have relatively short aloft endurance. Accordingly, such an UAV network cell may be ideal for moving quickly into position over a small geographical area to provide short-term supplemental network coverage until a ground base station comes back online.

Other factors that may affect whether an UAV network cell is dispatched may include governmental regulations and restrictions on UAV overflight. In one example, a government agency may mandate that an UAV may not exceed a maximum ground speed of 100 miles per hour and not exceed a maximum altitude of 400 feet above ground level (AGL). In instances where the UAV is a buoyant gas airship, the governmental flight regulations may mandate that the airship may not operate within a five-mile radius of any airport and may only operate no less than 500 feet from the base of any cloud. In another example, a government agency may establish a permanent or temporary no fly zone around a location prohibit certain types of airborne vehicles from operating at the location, restrict the days and/or times during which air borne vehicles may operate over the location, etc.

In various embodiments, the dispatch module 314 may obtain the factors for determining whether to dispatch an UAV network cell based on operation condition data 324 that are stored in flight operation data sources 326. The flight operation data sources 326 may be data sources that are maintained by the wireless carrier network 102 and/or one or more third-parties. The flight operation data sources 326 may include a meteorological database, a flight information database, an UAV database, a map database, and a network operations database. The meteorological database may provide weather data and weather forecasts for multiple geographical regions. The flight information database may provide governmental flight regulation information, government flight restriction information, flight schedules and flight plans of aircraft, aircraft identification information, and/or so forth. The UAV database may provide specifications and statuses of UAV network cells that are available for deployment by the cellular communication carrier. The map database may provide geographical information, terrain information, road infrastructure information, natural or man-made structure information, and/or so forth. The network operations database may provide the locations and specifications of the ground base stations and other network components of the wireless carrier network 102, as well as historical usage patterns and trends of subscriber user devices for different geographical areas. In some embodiments, the dispatch module 314 may use machine learning to determine whether to dispatch a particular UAV network cell based on the data from the flight operation data sources 326. Various classification schemes (explicitly and/or implicitly trained) and/or systems (e.g., support vector machines, neural networks, expert systems, Bayesian belief networks, fuzzy logic, data fusion engine, and/or the like) may be employed in connection with performing the dispatch decision.

A classifier is a function that maps an input attribute vector, $x=(x_1, x_2, x_3, x_4, x_n)$, to a confidence that the input belongs to a class, that is, $f(x)=confidence(class)$. Such classification may employ a probabilistic and/or statistical-based analysis (e.g., factoring into the analysis utilities and costs) to predict or infer an action that a user desires to be automatically performed. A support vector machine (SVM) is an example of a classifier that may be employed by the dispatch module 314. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of independence may also be employed.

The dispatch module 314 may further dispatch an UAV network cell to replace or supplement another UAV network cell in various circumstances. In one scenario, the dispatch module 314 may dispatch a replacement UAV network cell in response to receiving a notification from a currently operating UAV network cell that indicates a trouble status, such as a mechanical failure or low fuel. In another scenario, the dispatch module 314 may dispatch the replacement UAV network cell with greater communication bandwidth or throughput in response to a currently operating UAV network cell indicating that its communication capabilities are insufficient to sustained quality of experience (QoE) metrics for audio communication quality and/or video communication quality. In at least one embodiment, the QoE metrics may be provided by the user devices that are active in the geographical area.

In a related scenario, the dispatch module 314 may supplement a currently operating UAV network cell with one or more additional UAV network cells by dividing an existing geographical area served by the currently operating UAV network cell into multiple portions. In this way, each portion of the geographical area may be served by an UAV network cell. For example, the dispatch module 314 may receive a signal from the trajectory calculation module 316 indicating that a flight trajectory cannot be computed for an UAV network cell such that the UAV cell is able to reach a group of user devices in a particular section of a geographical area due to an obstacle in the form of a structure or terrain feature. In response, the dispatch module 314 may divide the geographical area into two portions, and dispatch another UAV network cell to reach the group of user devices in the previously unreachable portion from a different direction. The dispatch module 314 may further recall an UAV network cell from a geographical area when the presence of the UAV network cell is no longer necessary. In various instances, the dispatch module 314 may recall the UAV network cell when a number of subscriber user devices in the geographical area drops below a predetermined threshold, when a ground base station that was originally serving the geographical area resumes function, or when a recall request is manually inputted by a user via the user interface module 320.

The trajectory calculation module 316 may determine the flight trajectory of a dispatched UAV network cell based on the geolocations of the user devices in a geographical area. The dispatched UAV network cell may be actively providing supplemental network communication coverage to the user devices. In some embodiments, a user device with Global Positioning System (GPS)-capabilities or assisted GPS (A-GPS) capabilities may send its GPS position to an UAV network cell. In turn, the UAV network cell may forward the GPS position to the UAV network cell controller 118. Accordingly, the trajectory calculation module 316 may obtain the geolocations of each user device that is broadcasting its GPS position.

In other embodiments, a user device may measure the signal robustness of communication signals that the user device is receiving from the UAV network cell as the UAV network cell travels along a flight path. The measured signal robustness values are then transmitted by the user device to the UAV network cell. In turn, the UAV network cell may forward the measurements to the UAV network cell controller 118. Signal robustness may be measured by the user device in a multitude of ways, such as via signal strength or signal quality. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements. In this way, the trajectory calculation module 316 may use the multiple signal robustness values provided by each user device to triangulate a geolocation of each user device in a geographical area.

The trajectory calculation module 316 may generate a flight trajectory for the UAV network cell based on the geolocations of user devices in the geographical area. In various embodiments, the flight trajectory may be calculated such that the UAV network cell provides supplement network coverage to different groups of user devices in the geographical area. The trajectory calculation module 316 may use a best fit algorithm (e.g., least squares function, chi square function, etc.) to generate a flight trajectory that fits the UAV network cell within the geolocations of the user devices in the group. However, the computation of the flight trajectory may be constrained such that the UAV network cell always remains within a predetermined range of the ground base station that is providing the relay backhaul for the UAV network cell. The different groups of user devices may include all the user devices in the geographical area, a largest cluster of user devices in the geographical area, a selected group of one or more user devices, or a specific group of one or more high priority user devices. For example, the specific group may include one or more user devices that have been guaranteed by the wireless communication carrier with communication service that conforms to a particular SLA.

Each of the high priority user devices may be identified by a unique device identification code that is transmitted by the device. Alternatively, the trajectory calculation module 316 may compare the device identifiers of user devices (e.g., International Mobile Subscriber Identities (IMSIs), Mobile Station International Subscriber Directory Numbers (MSISDNs)) to a database table that stores device identifiers of high priority user devices, in order to determine whether high priority user devices are present in the geographical location, and then calculate an appropriate flight trajectory for the UAV network cell to provide network coverage to such high priority user devices. The trajectory calculation module 316 may continuously or periodically recalculate the flight trajectory as the geolocations of the user devices change.

A SLA may stipulate that the network coverage provides audio and/or video communication that meet certain QoE metrics. In some instances, the QoE metrics may specify a minimum mean opinion score (MOS) for audio quality or video quality for each communication, a maximum number of allowable unintentional audio muting events, a maximum number of voice call drop events, a maximum number of frozen video download events, a maximum number of webpage loading failure events, and/or so forth, for a specific service time period. In other instances, the QoE metrics may specify a maximum number of allowable audio/video synchronization failure events for the specific service time period, a maximum allowable web page loading response latency, a maximum number of allowable adaptive bit rate changes for the specific service time period.

In some embodiments, the trajectory calculation module 316 may further analyze operation condition data 324 related to a geographical area during the calculation of a flight trajectory for the UAV network cell. For example, operation condition data 324 may show natural and/or manmade structures in the geographical area that affect the calculation of the flight trajectory for the UAV network cell, e.g., structures that have to be evaded by the UAV network cell, terrain features that may block signal transmission, weather phenomenon that have to be avoided by the UAV network cell, and/or newly implemented governmental flight regulations or flight restrictions that may force the trajectory calculation module 316 to alter the calculated flight trajectory. The flight trajectory may be configured by the trajectory calculation module 316 to evade a structure or terrain feature by causing the UAV to fly around or over the structure or terrain feature. In some instances, the trajectory calculation module 316 may determine that it is unable to generate a flight trajectory that enables the UAV network cell to overfly or bypass a terrain feature or a structure in order to provide network coverage to a group of user devices located in a portion of a geographical area. In such an instance, the trajectory calculation module 316 may signal the dispatch module 314 to dispatch another UAV network cell to reach the group of user devices from a different direction.

The flight control module 318 may convert a flight trajectory that is calculated for an UAV network cell into control commands for the UAV network cell. In some instances, the flight control module 318 may further relay manual control commands that are inputted by a user via a user interface to the UAV network cell. In additional embodiments, the flight control module 318 may also pass on automatic operation commands to the UAV network cell. For example, these commands may cause the UAV network cell to perform automated operations, such as automatically takeoff from a departure point, fly to a particular geographical location, hover at the particular geographical location at a preset altitude, fly in a holding pattern with respect to the particular geographical location, return to and land at a predetermined destination point, and/or so forth.

The user interface module 320 may enable a user to interact with the UAV network cell controller 118 via a user interface controls. The user interface controls may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods. Accordingly, a user may monitor the locations and operations the UAV network cells with respect to user devices in a geographical area, manually input flight control commands that override the control of the UAV network cells by the UAV network cell controller 118, modify a geographical area that is serviced by an UAV network cell, and/or so forth.

The handover controller 322 may control the handover of user devices between ground network cells, such as between the base stations 110(1) and 110(2), as well as between an UAV network cell and a ground network cell. Handovers of a user device between network cells may occur as a user device of a user roams over a geographical region. During a handover, a user device that is engaged in an ongoing voice call or data session with the wireless carrier network 102 may be transferred from one network cell or another network cell of the wireless carrier network 102. In other words, the handover controller 322 may direct the user device to terminate an existing wireless communication connection with a first network cell and establish a new wireless communication connection with a second network cell without interrupting the voice call or data session. This transfer of the wireless communication device between the multiple radio cells provided by the network cells may be referred to as a handover. However, an UAV network cell ultimately has to use the wired backhaul of a nearby ground network cell to relay user device communication traffic to the core network 108 of the wireless carrier network 102. Thus, in some circumstances, the handover controller 322 may be configured to disallow the handing over of a user device from a ground network cell to an UAV network cell even when the user device indicates that the user device is getting a more robust communication signal from the UAV network cell.

In various embodiments, the handover controller 322 may receive a first signal robustness value from a user device for a ground network cell that is communicating with the user device. The ground network cell may be communicating with the user device for the purpose of routing voice or data communication traffic between the user device and the core network 108 of the wireless carrier network 102. The handover controller 322 may also receive a second signal robustness value from the user device for a particular network cell that is adjacent to the first network cell. The signal robustness of a signal the user device receives from multiple network cells may be measured by a connection manager on the user device. In various embodiments, the connection manager may be implemented on a chipset level, an operating system level, or an application level.

In the event that the second signal robustness value is greater than the first signal robustness value by a minimum difference value, the handover controller 322 may determine whether the particular network cell is an UAV network cell that is using the backhaul of the ground network cell to route user device communication to the core network 108. In some embodiments, the minimum difference value may be configured to prevent excessive handovers between the two network cells due to slight differences in the signal robustness values of the ground network cell and the particular network cell. In various embodiments, the handover controller 322 may identify the type of a network cell (e.g., ground vs. UAV) based on a cell identifier of the network cell. For example, the cell identifier of a network cell may include embedded cell type information that is readable by the handover controller 322. Alternatively, the handover controller 322 may use a carrier network database that cross references cell identifiers with cell types to ascertain the type of a network cell. The carrier network database may also identify the ground network cell whose backhaul is used by an UAV network cell.

Thus, if the particular network cell is another ground network cell or an UAV network cell that is not using the backhaul of the ground network cell, the handover controller 322 may direct the user device to switch from communicating with the ground network cell to communicating with the particular network cell. In response, the connection manager on the user device may direct the communication manager of the user device to establish a new communication connection with the particular network cell and terminate an existing communication connection with the ground network cell. However, if the particular network cell is in fact an UAV network cell that is using the backhaul of the ground network cell, then the handover controller 322 may refrain from directing the user device to switch from the ground network cell to the particular network cell unless a difference between the second signal robustness value and the first signal robustness value exceeds a maximum difference value. The maximum difference value may be greater than the minimum difference value, and is established to ensure that the user device is switched to the UAV network cell that is using the backhaul of the ground network cell only when the user device is truly unable to receive adequate service from the ground network cell. Accordingly, when such a difference exceeds the maximum difference value, the handover controller 322 may direct the user device to switch from communicating with the ground network cell to communicating with the particular network cell.

Figure 7:
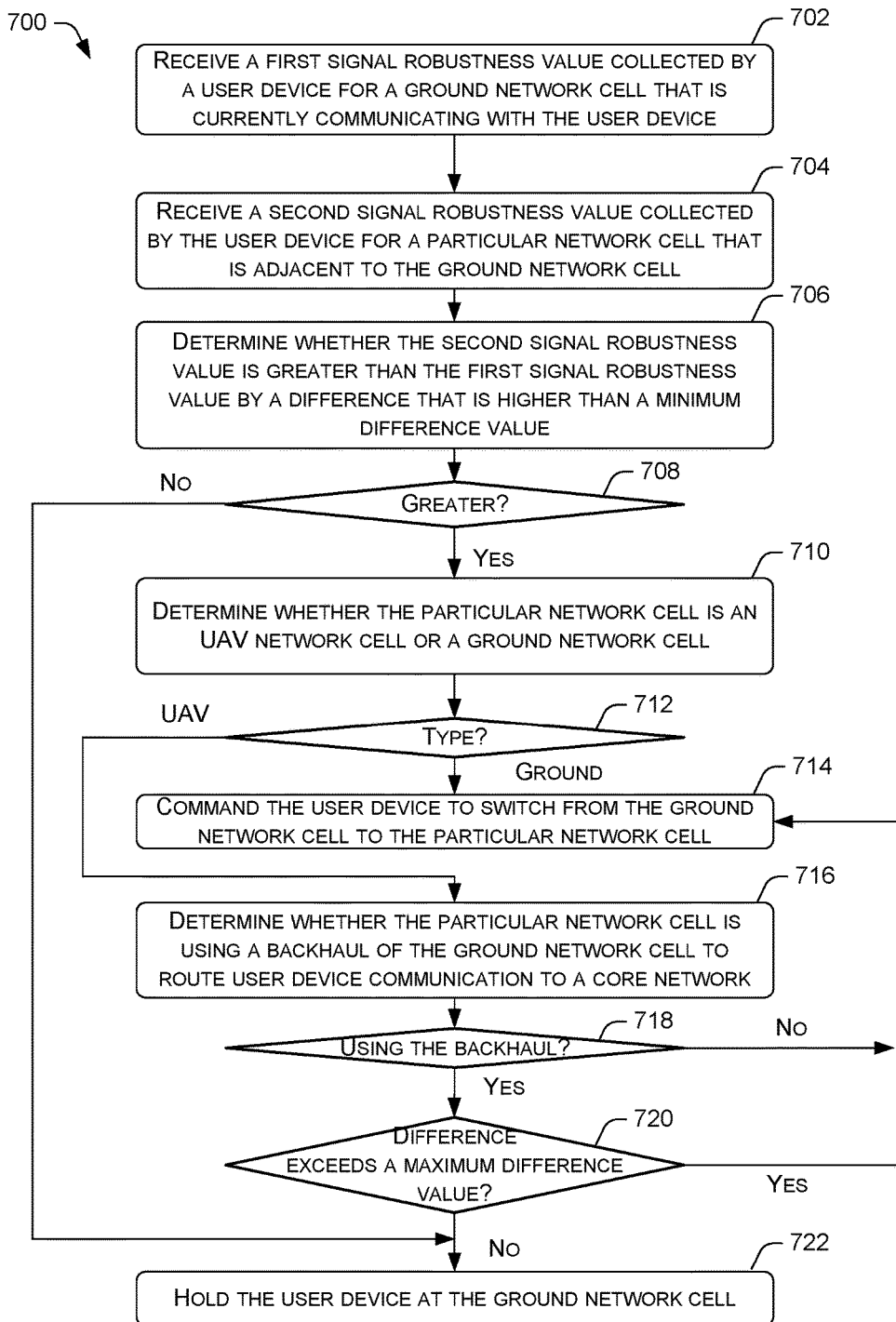
FIG. 7 is a flow diagram of an example process for managing the handover of a user device between multiple network cells that include at least one UAV network cell.

In alternative embodiments, rather than using a difference between the second signal robustness value and the first signal robustness value, the handover controller 322 may instead determine whether the first signal robustness value of the ground network cell drops below a minimal value threshold. When such a condition occurs, the handover controller 322 may direct the user device to switch when the first signal robustness value drops below the minimal value threshold. The minimal value threshold may be a signal robustness level below which the ground network cell is no longer able to adequately provide adequate communication services to the user device that meet one or more QoE metrics. Alternatively, the minimal value threshold may be a signal robustness level below which the user device may consider communication with the ground network cell to be lost. Additional details regarding the operations of the handover controller 322 are illustrated in FIG. 7.

Example Processes

FIGS. 4-7 present illustrative processes 400-700 implementing UAV-based cellular communication service delivery. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the environment 100 of FIG. 1.

Figure 4:
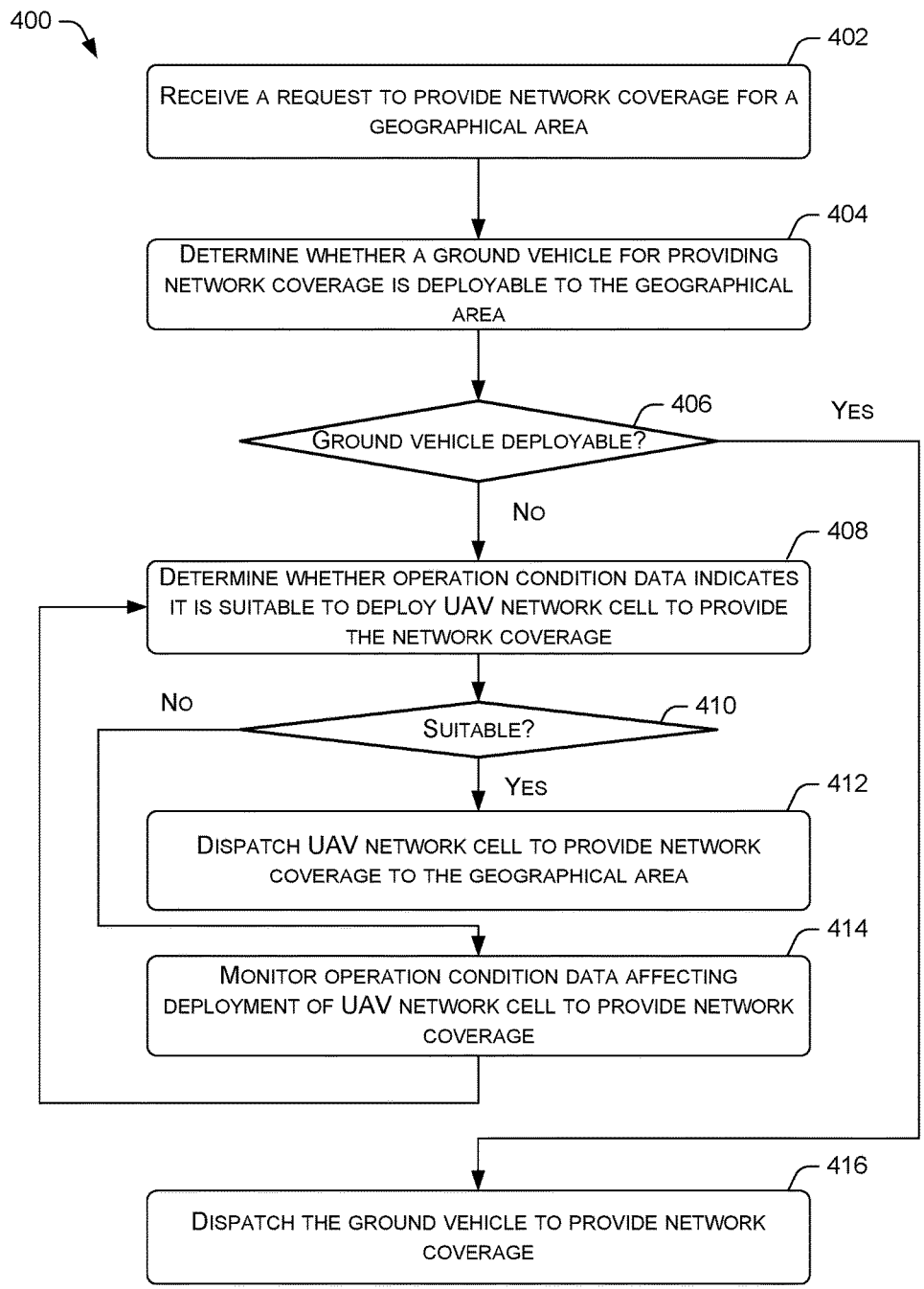
FIG. 4 is a flow diagram of an example process for dispatching an UAV network cell to a geographical location to provide network coverage.

FIG. 4 is a flow diagram of an example process 400 for dispatching an UAV network cell to a geographical location to provide network coverage. At block 402, the UAV network cell controller 118 may receive a request to provide network coverage for a geographical area. In some embodiments, the request may be manually inputted by an administrator of the wireless carrier network 102. For example, the administrator may use an interactive map to select a particular geographical area. In other embodiments, the request may be automatically initiated by a fault detection software that has detected a failure in a base station of the wireless carrier network 102.

At block 404, the UAV network cell controller 118 may determine whether a ground vehicle for providing network coverage is deployable to the geographical area. In various embodiments, the UAV network cell controller 118 may make such a determination based on terrain and roadway infrastructure data for the geographical area. Thus, at decision block 406, if the UAV network cell controller 118 determines that a ground vehicle is not deployable, the process 400 may proceed to block 408.

At block 408, the UAV network cell controller 118 may determine whether flight operation data indicates it is suitable to deploy the UAV network cell. In various embodiments, the flight operation data may include meteorological data, UAV network cell specification data, aircraft flight schedule and flight plan data, governmental flight regulation data, governmental flight restriction data, and/or so forth. Thus, at decision block 410, if the UAV network cell controller 118 determines that it is suitable to deploy the UAV network cell, the process 400 may proceed to block 412. At block 412, the UAV network cell controller 118 may dispatch the UAV network cell to provide network coverage to the geographical area.

Returning to decision block 410, if the UAV network cell controller 118 determines from the flight operation data that it is unsuitable to deploy the UAV network cell, the process 400 may proceed to block 414. At block 414, if the UAV network cell controller 118 may monitor the flight operation data affecting deployment of the UAV network cell to provide network coverage, such that the process 400 may loop back so that the UAV network cell controller 118 may make another determination at block 408. Returning to decision block 406, if the UAV network cell controller 118 determines that the ground vehicle is deployable, the process 400 may proceed to block 416. At block 416, the UAV network cell controller 118 may dispatch the ground vehicle to provide network coverage.

Figure 5:
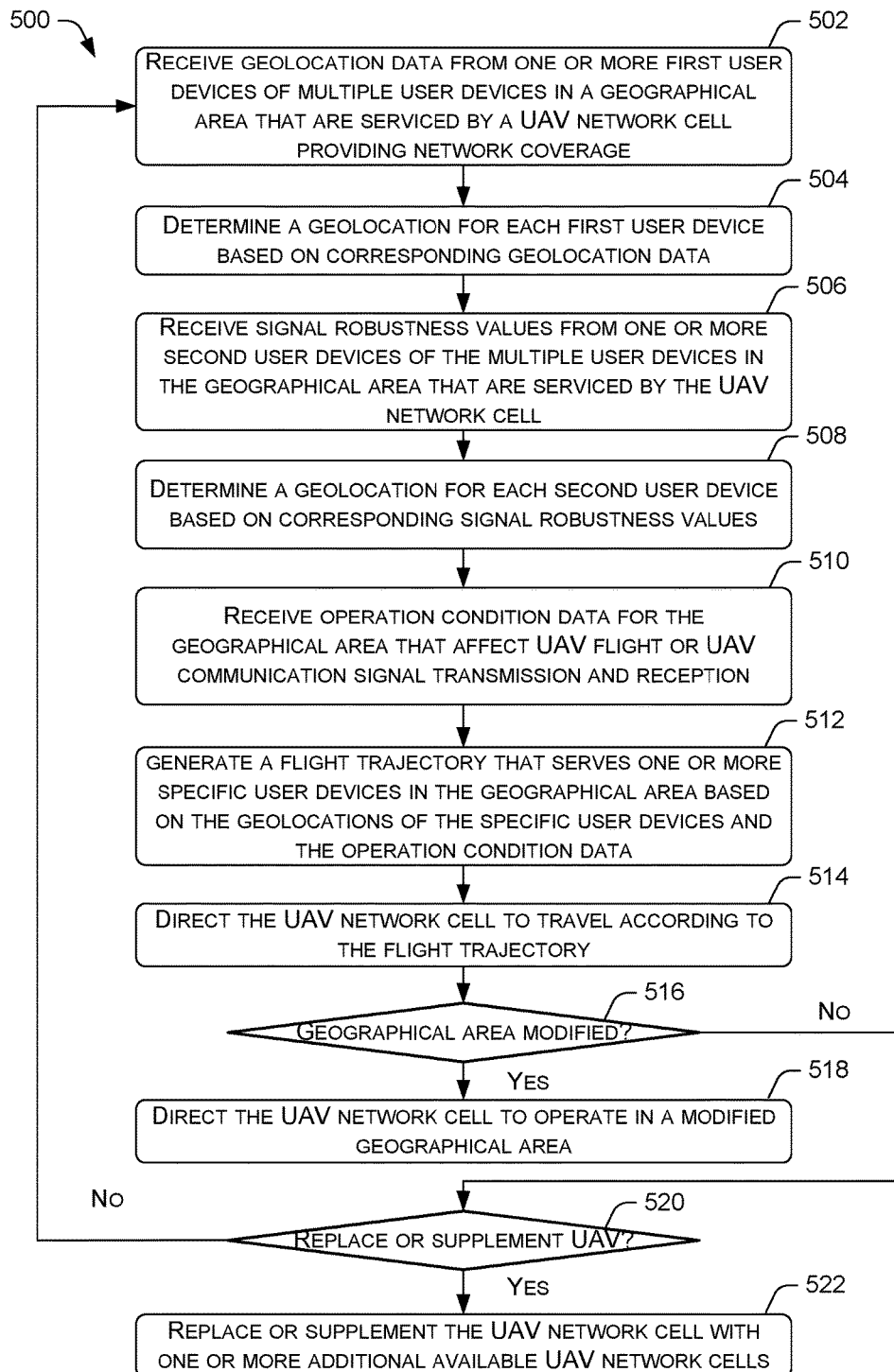
FIG. 5 is a flow diagram of an example process for managing an UAV network cell that is dispatched to a geographical location to provide network coverage.

FIG. 5 is a flow diagram of an example process 500 for managing an UAV network cell that is dispatched to a geographical location to provide network coverage. At block 502, the UAV network cell controller 118 may receive geolocation data from one or more first user devices of multiple user devices in a geographical area serviced by an UAV network cell that is providing network coverage. In various embodiments, the geolocation in the form of GPS coordinates of each first user device may be provided by a GPS or A-GPS sensor on the device. The geolocation data is transmitted by each user device to the UAV network cell, which then forwards the geolocation data to the UAV network cell controller 118. At block 504, the UAV network cell controller 118 may determine a geolocation for each first user device based on the corresponding geolocation data.

At block 506, the UAV network cell controller 118 may receive signal robustness values from one or more second user devices of the multiple user devices in the geographical area that are serviced by the UAV network node. In various embodiments, the signal robustness value provided by a user device may be a signal strength or signal quality measurement that is obtained by the user device.

At block 508, the UAV network cell controller 118 may determine a geolocation for each second user device based on corresponding signal robustness values for the user device. In various embodiments, the UAV network cell controller 118 may use the multiple signal robustness values provided by each user device to triangulate a geolocation of each user device in a geographical area.

At block 510, the UAV network cell controller 118 may receive operation condition data for the geographical area that affect UAV flight or UAV communication signal transmission and reception. In various embodiments, the operation condition data may show natural and/or manmade structures in the geographical area that affect the calculation of the flight trajectory for the UAV network cell, e.g., structures that have to be evaded by the UAV network cell, terrain features that may block signal transmission, weather phenomenon that have to be avoided by the UAV network cell, or governmental flight regulations or restrictions that may force the UAV network cell controller 118 to alter the flight trajectory.

At block 512, the UAV network cell controller 118 may generate a flight trajectory for the UAV network cell that serves one or more specific user devices in the geographical area based at least on the geolocations of the specified user devices. In various embodiments, the UAV network cell controller 118 may use a best fit algorithm (e.g., least squares function, chi square function, etc.) to generate a flight trajectory that fits the UAV network cell within the geolocations of the one or more specific user devices. However, the computation of the flight trajectory may be constrained such that the UAV network cell always remains within a predetermined communication range with the ground base station that is providing the relay backhaul for the UAV network cell. In some embodiments, the calculation performed by the UAV network cell controller 118 may also take into account the operation condition data. At block 514, the UAV network cell controller 118 may direct the UAV network cell to travel according to the flight trajectory. In various embodiments, the UAV network cell controller 118 may convert the calculated flight trajectory into control commands that are sent to the UAV network cell.

At decision block 516, the UAV network cell controller 118 may determine whether the geographical area is modified. In some instances, the geographical area may be modified by a user input from a user. In other instances, the geographical area may be automatically modified (e.g., area decreased) by the UAV network cell controller 118 when the UAV network cell controller 118 determines that the number of subscriber user devices in the geographical area exceeds a predetermined maximum threshold. Conversely, the geographical area may be automatically modified (e.g., area increased) by the UAV network cell controller 118 when the UAV network cell controller 118 determines that the number of subscriber user devices in the geographical area has fallen below a predetermined minimal threshold. Thus, at decision block 516, if the UAV network cell controller 118 determines that the geographical area in modified, the process 500 may proceed to block 518.

At block 518, the UAV network cell controller 118 may direct the UAV network cell to operate in a modified geographical area. In various embodiments, the modified geographical area may include a portion of the original geographical area, may overlap with the original geographical area, or may be entirely different from the original geographical area. However, if the UAV network cell controller 118 determines that the geographical area is not modified, the process 500 may proceed to decision block 520.

At decision block 520, the UAV network cell controller 118 may determine whether the UAV network cell is to be replaced or supplemented with one or more additional UAV network cells. For example, the UAV network cell controller 118 may replace the UAV network cell with another UAV network cell due to mechanical trouble or low fuel, or supplement the UAV network cell with one or more additional UAV network cells to provide greater communication bandwidth, throughput, or coverage for the geographical area. Thus, if the UAV network cell controller 118 determines that the UAV network cell is to be replaced or supplemented, the process 500 may continue to block 522.

At block 522, the UAV network cell controller 118 may replace or supplement the UAV with one or more additional available UAV network cells. The UAV network cell controller 118 may send control commands to the UAV network cell to remove the UAV network cell from the geographical area. In the alternative or concurrently, The UAV network cell controller 118 may send control commands to the one or more additional available UAV network cells to vector these cells to the geographical area. However, if the UAV network cell controller 118 determines that the UAV network cell is not to be replaced or supplemented, the process 500 may loop back to block 502.

Figure 6:
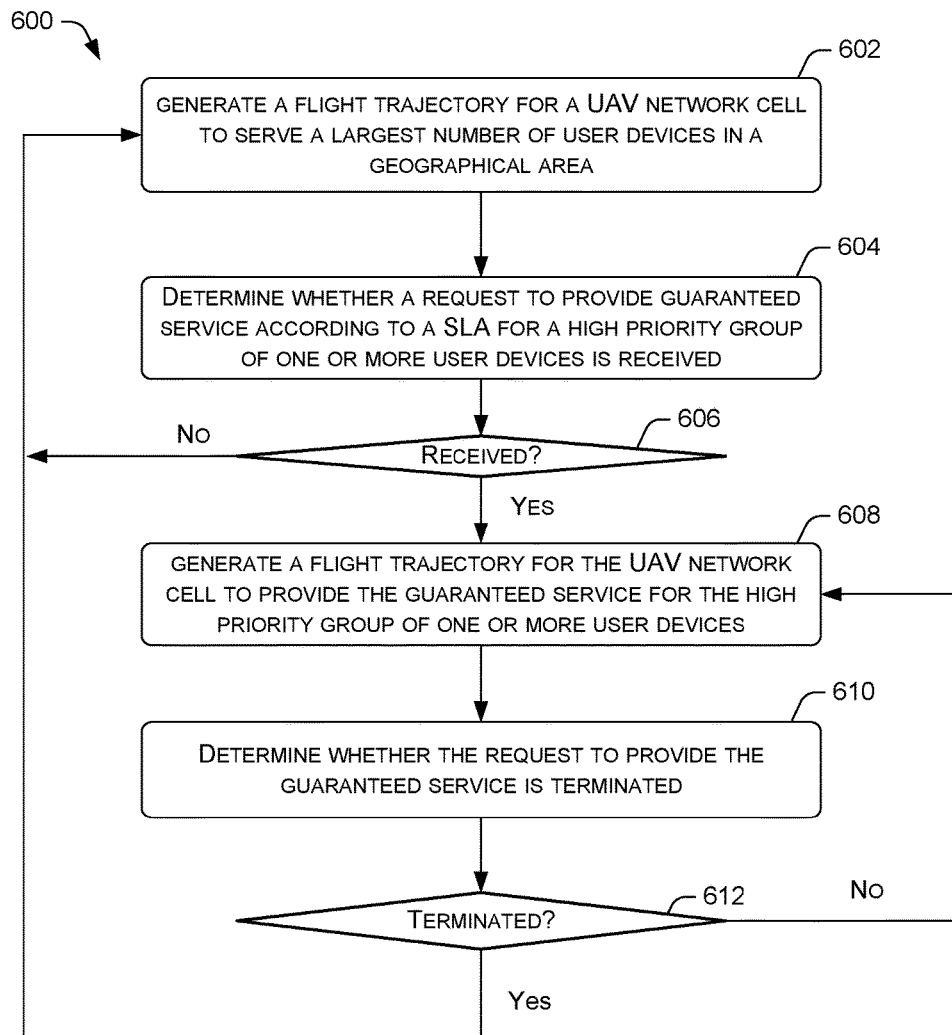
FIG. 6 is a flow diagram of an example process for generating a flight trajectory for an UAV network cell that is providing network coverage in a geographical area.

FIG. 6 is a flow diagram of an example process 600 for generating a flight trajectory for an UAV network cell that is providing network coverage in a geographical area. The process 600 may further illustrate block 512 of the process 500. At block 602, the UAV network cell controller 118 may generate a flight trajectory for an UAV network cell to serve a largest number of user devices in a geographical area. At block 604, the UAV network cell controller 118 may determine whether a request to provide guaranteed service according to a SLA for a high priority group of one or more user devices is received. For example, the one or more user devices in the high priority group may belong to emergency responders, such as emergency medical technicians, law enforcement officers, firefighters, etc. Thus, at decision block 606, if the UAV network cell controller 118 determines that the request is received, the process 600 may proceed to block 608.

At block 608, the UAV network cell controller 118 may generate a flight trajectory for the UAV network cell to provide the guaranteed service for the high priority group of one or more user devices. At block 610, the UAV network cell controller 118 may determine whether the request to provide the guaranteed service is terminated. For example, the request may be manually terminated upon an input from a user, or automatically terminated when a service duration specified for the SLA expires. Thus, at decision block 612, if the UAV network cell controller 118 determines that the request is terminated, the process 600 may loop back to block 602.

Returning to decision block 606, if the UAV network cell controller 118 determines that no request to provide guaranteed service is received, the process 600 may also loop back to block 602. Return to decision block 612, if the UAV network cell controller 118 determines that the request is not terminated, the process 600 may loop back to block 608.

FIG. 7 is a flow diagram of an example process 700 for managing the handover of a user device between multiple network cells that include at least one UAV network cell. At block 702, the handover controller 322 may receive a first signal robustness value collected by a user device for a ground network cell that is currently communicating with the user device. The ground network cell may be communicating with the user device for the purpose of routing voice or data communication traffic between the user device and the core network 108 of the wireless carrier network 102. In various embodiments, the signal robustness value may be measured by the user device in a multitude of ways, such as via signal strength or signal quality. In various embodiments, the handover controller 322 may be implemented at the radio access network 106 or the core network 108 of the wireless carrier network 102. At block 704, the handover controller 322 may receive a second signal robustness value collected by the user device for a particular network cell is proximate to the first network cell.

At block 706, the handover controller 322 may determine whether the second signal robustness value is greater than the first signal robustness value by at least a minimum difference value. In some embodiments, the minimum difference value may be configured to prevent excessive handovers between the two network cells due to slight differences in signal robustness values of the ground network cell and the particular network cell. Thus, at decision block 708, if the handover controller 322 determines that the second signal robustness value is greater than the first signal robustness value by at least the predetermined value difference, the process 700 may proceed to block 710.

At block 710, the handover controller 322 may determine whether the particular network cell is UAV network cell or a ground network cell. In various embodiments, the type of the particular network cell may be determined by the handover controller 322 based on the cell identification information of the particular network cell. Accordingly, at decision block 712, if the handover controller 322 determines that the particular network cell is a ground network cell, the process 700 may proceed to block 714. At block 714, the handover controller 322 may command the user device to switch from communicating with the ground network cell to communicating with the particular network cell. In various embodiments, the switching from the ground network cell to the particular network cell may be performed by a connection manager on the user device.

However, if the handover controller 322 determines that the particular network cell is an UAV cell at decision block 712, the process 700 may proceed to decision block 716. At decision block 716, the handover controller 322 may determine whether the particular network cell is using a backhaul of the ground network cell to route user device communication to the core network 108 of the wireless carrier network 102. In some instances, the particular network cell may be an UAV network cell that is using the backhaul of the ground network cell to route user device communication to the core network 108. In alternative instances, the particular network cell may be an UAV network cell that is using the backhaul of a different ground network cell to route user device communication to the core network 108. Accordingly, at decision block 718, if the handover controller 322 determines that the particular network cell is an UAV network cell that is using the backhaul of the ground network cell, the process 700 may proceed to decision block 720.

At decision block 720, the handover controller 322 may determine whether a difference between the second signal robustness value and the first signal robustness value exceeds a maximum difference value. In various embodiments, the maximum difference value may be greater than the minimum difference value, and is established to ensure that the user device is switched to the UAV network cell that is using the backhaul of the ground network cell only when the user device is truly unable to receive adequate service from the ground network cell. Accordingly, if the handover controller 322 determines that the difference does not exceed the maximum difference value, the process 700 may proceed to block 722.

At block 722, the handover controller 322 may hold the user device at the first network cell by refraining from directing the user device to perform any handover, even though a handover would normally occur. This hold action by the handover controller 322 effectively prevents the user device from being needlessly switched from the ground network cell to an UAV network cell for a slightly higher signal robustness only to have user device communication traffic being handled by the same backhaul as before the switch. However, if the handover controller 322 determines that the difference between the second signal robustness value and the first signal robustness value exceeds the maximum difference value, the process 700 may return to block 714. Once again, at block 714, the handover controller 322 may command the user device to switch from communicating with the ground network cell to communicating with the particular network cell.

Returning to decision block 718, if the handover controller 322 determines that the particular network cell is not using the backhaul of the ground network cell, the process 700 may also loop back to block 714. Once again, at block 714, the handover controller 322 may command the user device to switch from communicating with the ground network cell to communicating with the particular network cell. Returning to decision block 708, if the handover controller 322 determines that the second signal robustness value is not greater than the first signal robustness value by at least the minimum difference value, the process 700 may directly proceed to block 722. Once again, the handover controller 322 may hold the user device at the ground network cell by refraining from directing the user device to perform any handover at block 722.

The use of UAV network cells may enable a wireless communication carrier to provide supplemental cellular network communication coverage to geographical areas that are otherwise inaccessible or difficult to access in a reasonable amount using ground-vehicle based network cells. In this way, UAV network cells of a wireless communication carrier may provide supplemental wireless communication services to subscriber user devices when a natural disaster or a manmade event disrupts normal wireless communication services. Alternatively, the UAV network cells of a wireless communication carrier may provide temporary but essential wireless communication services to remote regions to support emergency responses or law enforcement activities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system, comprising:
one or more processors; and
memory having instructions stored therein, the instructions, when executed by the one or more processors, cause the one or more processors to perform acts comprising:
determining geolocations of a plurality of user devices in a geographical area that is serviced by an unmanned aerial vehicle (UAV) network cell, the UAV network cell extending network coverage of a wireless carrier network to at least a portion of the geographical area;
sending a control command to the UAV network cell that dispatches the UAV network cell to travel according to a flight trajectory that provides network coverage to one or more specific user devices of the plurality user devices in the geographical area based on the geolocations of the plurality of user devices, the UAV network cell using a backhaul of a ground network cell to route communication of the one or more specific user devices to a core network of the wireless carrier network
receiving a first signal robustness value for the ground network cell and a second signal robustness value for a particular network cell that is proximate to the ground network cell from a user device that is communicating with the ground network cell, the second signal robustness value being greater than the first signal robustness value;
sending a command that directs the user device to switch from communicating with the ground network cell to communicating with the particular network cell in response to determining that the particular network cell is an additional UAV network cell that is not using the backhaul of the ground network cell to route communication of any user devices to the core network; and
refraining from sending the command that directs the user device to switch from communicating with the ground network cell to communicating with the particular network cell in response to determining that the particular network cell is the UAV network cell that is using the backhaul of the ground network cell to route communication to the core network, despite the first and second robustness values indi- cating that the UAV network cell provides a stronger communication signal to the user device than the ground network cell.

2. The system of claim 1, wherein the acts further comprise:
receiving a request to provide network coverage for the geographical area, the request being manually inputted by a user or initiated by a fault detection software that detected a failure in a base station of the wireless carrier network; and
sending an additional control command that dispatches the UAV network cell to the geographical area in response to determining at least that a ground vehicle for providing the network coverage is not deployable to the geographical area or not deployable to the geographical area in a predetermined amount of time.

3. The system of claim 2, wherein the sending the additional control command includes sending the additional control command further in response the operation condition data indicating that the UAV is deployable to the geographical area.

4. The system of claim 1, wherein the operation condition data includes one or more of meteorological data for the geographical area, flight performance and communication specification data for the UAV network cell, terrain data for the geographical area, flight schedule data for aircraft that traverses the geographical area, flight plan data for aircraft that traverse the geographical area, governmental flight regulation data for the geographical area, or governmental flight restriction data for the geographical area.

5. The system of claim 1, wherein the refraining further comprises refraining from sending the command in response to determining that the particular network cell is the UAV network cell that is using the backhaul of the ground network cell to route communication to the core network and a difference between the second signal robustness value and the first signal robustness value does not exceed a maximum difference value.

6. The system of claim 1, wherein the acts further comprise directing the UAV network cell to operate in a modified geographical area that is a portion of the geographical area, overlaps the geographical area, or is different from the geographical area in response to a modification to the geographical area.

7. The system of claim 1, wherein the acts further comprise at least one of replacing or supplementing the UAV network cell with another UAV network cell in response to a trouble indication from the UAV network cell, or in response to an indication that communication capabilities of the UAV network cell are insufficient to sustain one or more quality of experience (QoE) metrics with respect to an audio communication quality or a video communication quality for the one or more specific user devices.

8. The system of claim 7, wherein the one or more specific user devices are located in a particular portion of the geographical area, further comprising dispatching another UAV network cell to provide the network coverage to the one or more specific user devices in response to the flight trajectory not enabling the UAV network cell to reach the particular portion of the geographical area due to a terrain feature or a structure.

9. The system of claim 1, wherein the one or more specific user devices includes a largest cluster of user devices, a selected group of user devices, or a particular group of one or more high priority user devices that belong to emergency responders.

10. The system of claim 1, wherein the generating includes using a best fit algorithm to generate the flight trajectory that fits the UAV network cell within the geolocations of the one or more specific user devices.

11. The system of claim 1, wherein the generating includes generating the flight trajectory based in part on operation condition data that indicate one or more of a natural or manmade structure in the geographical area that affects the flight trajectory, a terrain feature that blocks signal transmission, a weather phenomenon that the UAV network cell has to avoid, or a governmental flight regulation or flight restriction that forces an alteration of the flight trajectory.

12. The system of claim 1, wherein the UAV network cell is a fixed wing aircraft, a rotary wing aircraft, a rigid buoyant gas airship, or a non-rigid buoyant gas airship.

13. The system of claim 1, wherein a geolocation of a user device of the plurality of user devices is provided by a global positioning system (GPS) component of the user device or triangulated for the user device from multiple signal robustness measurements provided by the user, the multiple signal robustness measurements being obtained by the user device for communication signals transmitted by the UAV network cell.

14. One or more non-transitory computer-readable media storing computer-executable instructions that upon execution cause one or more processors to perform acts comprising:
dispatching an unmanned aerial vehicle (UAV) network cell to a geographical area in response to determining at least that a ground vehicle for providing network coverage of a wireless carrier network is not deployable to the geographical area due to the lack of roadways in the geographical area;
determining geolocations of a plurality of user devices in the geographical area that are serviced by the network cell, the UAV network cell extending the network coverage of the wireless carrier network to at least a portion of the geographical area;
receiving operation condition data for the geographical area that affect at least one of UAV flight or UAV communication signal transmission or reception for the UAV network cell;
generating a flight trajectory that provides network coverage to one or more specific user devices of the plurality user devices in the geographical area based on the geolocations of the plurality of user devices and the operation condition data; and
sending a control command to the UAV network cell that directs the UAV network cell to travel according to the flight trajectory.

15. The one or more non-transitory computer-readable media of claim 14, wherein the operation condition data includes one or more of meteorological data for the geographical area, flight performance and communication specification data for the UAV network cell, terrain data for the geographical area, flight schedule data for aircraft that traverses the geographical area, flight plan data for aircraft that traverse the geographical area, governmental flight regulation data for the geographical area, or governmental flight restriction data for the geographical area.

16. The one or more non-transitory computer-readable media of claim 14, wherein the UAV network cell is using a backhaul of a ground network cell to route user device communication to a core network of the wireless carrier network, and wherein the acts further comprise:

receiving a first signal robustness value for the ground network cell and a second signal robustness value for a particular network cell that is proximate to the ground network cell from a user device that is communicating with the ground network cell, the second signal robustness value being greater than the first signal robustness value;

sending a command that directs the user device to switch from communicating with the ground network cell to communicating with the particular network cell in response to determining that the particular network cell is a ground network cell or an additional UAV network cell that is different from the UAV network cell; and refraining from sending the command that directs the user device to switch from communicating with the ground network cell to communicating with the particular network cell in response to determining that the particular network cell is the UAV network cell that is using the backhaul of the ground network cell to route communication to a core network of the wireless carrier network.

17. The one or more non-transitory computer-readable media of claim 14, wherein the one or more specific user devices includes a largest cluster of user devices, a selected group of user devices, or a particular group of one or more high priority user devices that belong to emergency responders.

18. A computer-implemented method, comprising:

receiving a first signal robustness value for a ground network cell of a wireless carrier network from a user device that is communicating with the ground network cell, the ground network cell including a backhaul that routes user device communications of user devices to a core network of the wireless carrier network;

receiving a second signal robustness value for a particular network cell of the wireless carrier network that is proximate to the ground network cell from the user device, the second signal robustness value being greater than the first signal robustness value;

sending a command that directs the user device to switch from communicating with the ground network cell to communicating with the particular network cell in response to determining that the particular network cell is a UAV network cell that is not using a backhaul of the ground network cell to route communications of the user device to the core network of the wireless carrier network; and refraining from sending the command that directs the user device to switch from communicating with the ground network cell to communicating with the network cell in response to determining that the particular network cell is a UAV network cell that is using the backhaul of the ground network cell to route communications of the user device to the core network of the wireless carrier network, and a difference between the second signal robustness value and the first signal robustness value does not exceed a maximum difference value.

19. The computer-implemented method of claim 18, wherein the difference between the second signal robustness value and the first signal robustness value exceeds a minimal difference value that is less than the maximum difference value.

20. The computer-implemented method of claim 18, further comprising sending the command that directs the user device to switch from communicating with the ground network cell to communicating with the particular network cell in response to determining that the difference between the second signal robustness value and the first signal robustness value exceeds the maximum difference value, and the particular network cell is the UAV network cell that is using the backhaul of the ground network cell.

* * * * *